INVENTORS
HIROE OSAFUNE
TOSHIO KUROSAWA
BY ICHIEMON SASAKI
Hopgood & Calimafde
ATTORNEYS INVENTORS
HIROE OSAFUNE
TOSHIO KUROSAWA
ICHIEMON SASAKI
BY
Hopgood & Calimafde
ATTORNEYS United States Patent Office 3,258,723

Patented June 28, 1966

3,258,723

ELECTRICAL DEVICE HAVING THIN FILMS EXHIBITING RESISTANCE, CAPACITANCE AND INDUCTANCE

Hiroe Osafune, Toshio Kurosawa, and Ichiemon Sasaki, Tokyo, Japan, assignors to Nippon Electric Company Limited, Tokyo, Japan, a corporation of Japan Filed Jan. 23, 1963, Ser. No. 253,471
Claims priority, application Japan, Jan. 30, 1962, 37/3,453
1 Claim. (Cl. 333—70)

This invention relates to a miniature device having a plurality of electrical components formed as an integral part thereof, and more particularly to such a device which is provided with thin films for modifying the electrical characteristics of the device in a desired manner.

In micro-miniaturized equipment it is desirable to employ R–C circuits in lieu of L–C circuits whenever possible since the resistance component can be made much smaller than the inductance. The inductance, however, is intrinsically different from the resistor in frequency characteristics and therefore the use of the resistor has the disadvantage that different circuit characteristics are obtained.

Accordingly, it is an object of this invention to provide means for compensating for differences in circuit characteristics when a resistance is employed in a circuit in lieu of an inductor.

It is a further object of our invention to provide an integrated circuit having inductance characteristics which is smaller than such circuits heretofore known having similar inductance characteristics.

All of the objects, features and advantages of this invention and the manner of attaining them will become more apparent and the invention itself will be best understood by reference to the following description of an embodiment of the invention taken in conjunction with the accompanying drawing, in which:

FIG. 1 is a circuit diagram of a band elimination filter;

FIG. 2*a* is a plan view of a semiconductor device which embodies the circut elements of FIG. 1;

FIG. 2*b* is a sectional view of the device of FIG. 2*a* taken on the line 2*b*—2*b* thereof;

Throughout the various figures, like numerals indicate identical or similar parts.

In accordance with an aspect of the invention there is provided an integrated semiconductor device comprising a semiconductor body, said body including at least one junction therein formed of a P type conductivity region in contiguous relationship with an N type conductivity region, terminal means connected to the regions forming said junction, and a layer of magnetic material disposed on the regions and adjacent vicinity said junction and insulated from said junction and said terminal means, to thereby impart an electrical inductance characteristic to said device.

Figure 1:
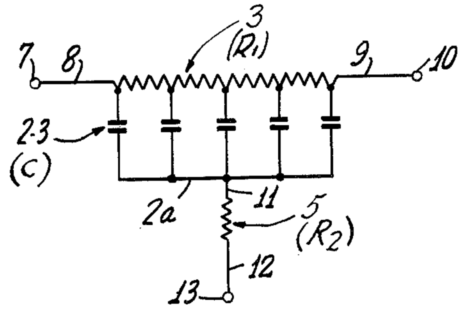

Referring now to the drawings, FIG. 1 shows a band elimination filter which includes a resistance $R_1$ designated by the numeral 3, a resistance $R_2$ designated by the numeral 5 and a capacitance C indicated by the designation 2–3 and comprising five individual capacitor elements.

Figure 2A:
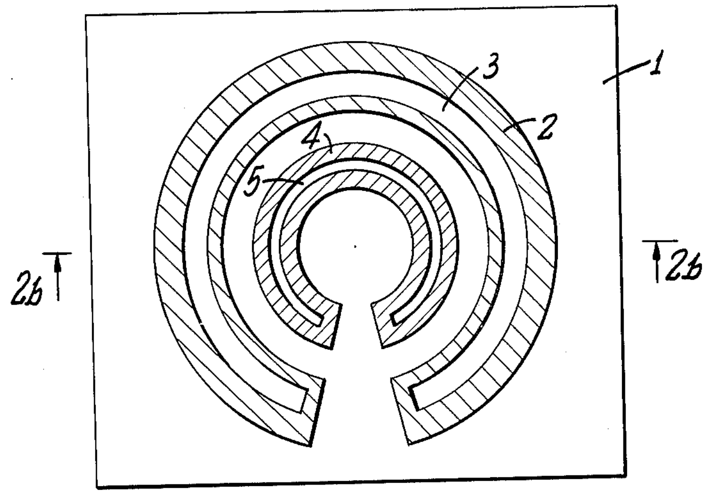
Figure 2B:
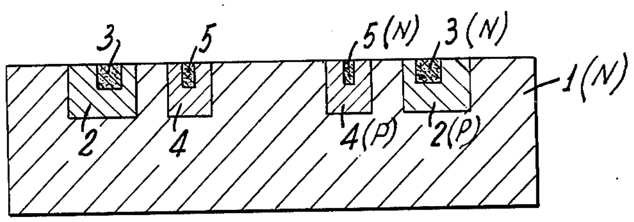

The individual components which make up the circuit of FIG. 1 are formed as a part of a single integrated block or body unit 1 shown in FIGS. 2*a* and 2*b*. The body 1 may be N-type silicon having formed therein, by diffustion of impurities for example, P-type domains 2 and 4 and N-type domains 3 and 5. The body is thus formed into an integrated block having two ring shaped NPN junctions.

Figure 3:
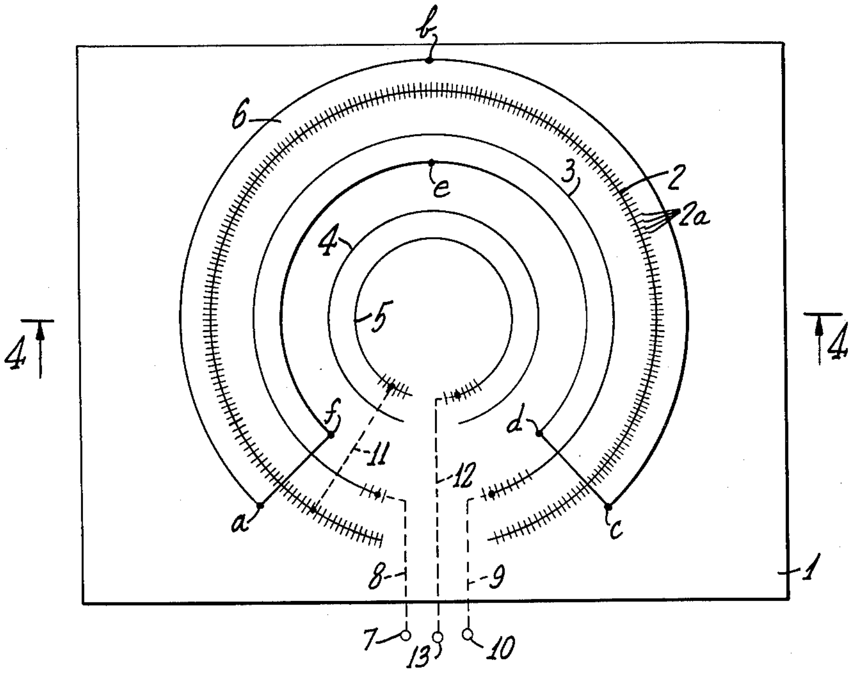
FIG. 3 illustrates a practical construction of a device made in accordance with the invention.

FIG. 3 illustrates a practical construction utilizing the body or block 1 shown in FIGS. 2*a* and 2*b* for achieving the circuit of FIG. 1. In FIG. 3, lines 2, 3, 4 and 5 denote schematically the domains 2, 3, 4 and 5 of FIGS. 2*a* and 2*b*. The short closely spaced radial lines on selected domains indicate a metal coating such as for example aluminum, deposited on the surfaces of domains and each coating is deposited in such a manner as not to encroach upon the other domains. The terminal 7 is connected to one end of the domain 3 by the lead wire 8 to utilize the domain 3 as the resistance $R_1$ of FIG. 1, while the other end is connected to the terminal 10 by the lead wire 9. These lead wires are so connected by means of small local metal coatings to the ends of the domain 3. By using the boundary of the domains 2 and 3, i.e. the P–N junction 2–3, the capacity C of FIG. 1 is formed. A metal coating 2*a* is coated on the domain 2 to serve as the conductor 2*a* of FIG. 1; this coating 2*a* is connected at one end to one end of the domain 5 by the lead wire 11. The other end of the domain 5 is connected to the terminal 13 by the lead wire 12. The resistance of the domain 5 serves as the resistance $R_2$ of FIG. 1.

Figure 4:
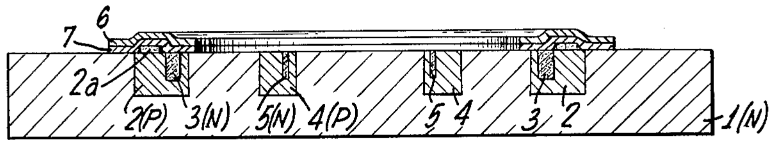
FIG. 4 is a sectional view of the device of FIG. 3 taken along the line 4—4 thereof.
Figure 5:
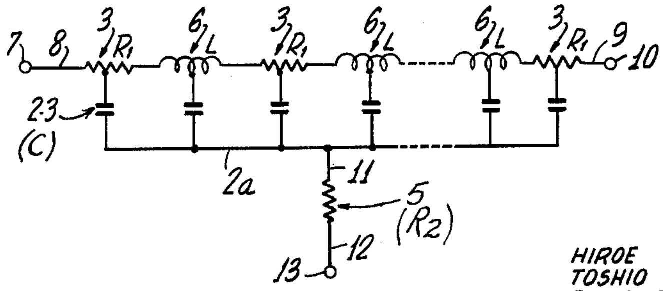
FIG. 5 is a circuit diagram illustrating the type of circuit that can be achieved in accordance with the teachings of the invention.

When the various connections are made as described above the circuit shown in FIG. 1 is of course produced. In actual practice, however, before the domains are interconnected, the body 1 is further treated in accordance with the principles of this inventon to thereby obtain a circuit somewhat similar to that of FIG. 1 but which also includes inductance characteristics. The circuit resulting from such treatment is shown in FIG. 5. This treatment will now be described. After the metal coatings have been evaporated on the domain 2 and on the end portions of the various other domains, a suitable insulating material 7, such as for example silica ($SiO_2$), is deposited over the domains 2 and 3, except at the domain terminals, as shown in FIG. 4. Next a material 6 having magnetic properties, such as for example permalloy, is deposited, over the coating 7 to thereby form a multi-layer arcuate shaped region designated by the letters *a*, *b*, *c*, *d*, *e*, and *f* of FIG. 3. This region is generally horseshoe-shaped and does not extend over the central portion of the block. The various coatings 2*a*, 6 and 7 may be deposited by any suitable process, the evaporation technique however being preferred.

The film 6, as can be seen from FIG. 5, produces an equivalent inductance in the form of a plurality of inductance elements L in series with the resistance $R_1$ of FIG. 1, thereby improving the frequency characteristics of the circuit of FIG. 1. Special attention should be paid to the choice of film material 6, the method for depositing this film, and other factors, to thereby provide the most desirable inductance characteristics from this film.

Although this invention has been described with specific reference to generally circular shaped regions in and on the body of the semi-conductor, various other shapes can obviously also be employed. Also, the semiconductor body 1 and the various regions or domains therein need not be limited to the specific type materials and type regions employed in the embodiment described. Further, the invention may also be carried out by utilizing various films and film techniques to provide the inductance characteristic. For example, the inductance-imparting film 6 need not be disposed in contact with an insulating layer 7 but may, if desired, be located immediately adjacent the semiconductor body without the use of such an insulating film.

Thus, while the foregoing description sets forth the principles of the invention in connection with specific apparatus, it is to be understood that the description is made only by way of example and not as a limitation of the scope of the invention as set forth in the objects thereof and in the accompanying claim.

What is claimed is:

An electrical device having a plurality of electrical circuit components formed integrally therewith comprising a semiconductor body of a given type conductivity, said body having therein a plurality of domains also of said given type conductivity and a plurality of domains having a type conductivity opposite to that of said given type, said domains comprising substantially concentric regions of generally circular shape, at least one of said regions being in the form of an extended circular arc having opposite ends for receiving electrical connections, each of said domains of said opposite conductivity being in contact with one of said domains of said given type conductivity and also forming a barrier between such given type conductivity domain and the main portion of said body, each of said domains of said opposite type conductivity further forming one junction with said main body portion and another junction with the domain of given type conductivity with which it is associated, conductive means interconnecting selected ones of said domains to thereby produce an electrical circuit within said device, a layer of magnetic material in the form of an extended circular arc, said layer being disposed in closely spaced overlying relationship with one of said domains of opposite type conductivity and with the domain of given type conductivity with which said domain of opposite type conductivity is associated, to thereby impart an electrical inductance characteristic to said device, a metallic coating interposed between said layer and one of the domains from which said layer is closely spaced and also being in intimate contact with said latter mentioned domain, whereby an effective capacitance characteristic is imparted to said device, and a coating of insulating material interposed between said metallic coating and said layer to thereby insulate said layer from said metallic coating.

References Cited by the Examiner

UNITED STATES PATENTS

| | | | |
|---|---|---|---|
| 2,027,067 | 1/1936 | Schubert | 333—79 |
| 2,260,296 | 10/1941 | Christopher et al. | 333—31 |
| 2,637,777 | 5/1953 | Lelby et al. | 333—79 |
| 2,744,970 | 5/1956 | Shockley | 407—88.5 |
| 3,022,472 | 2/1962 | Tanenbaum et al. | 333—18 |
| 3,060,327 | 10/1962 | Dacey | 307—88.5 |
| 3,148,344 | 9/1964 | Kaufman | 333—70 |
| 3,163,833 | 12/1964 | Burson | 333—79 |

OTHER REFERENCES

Electronics, May 13, 1960, Lathrop, "Semi-Conductor Networks," pages 69–78.

Science, vol. 132, Oct. 21, 1960, Herwald, "Integration of Circuit Functions," pages 1127–1133.

HERMAN KARL SAALBACH, *Primary Examiner.*

C. BARAFF, *Assistant Examiner.*